Aug. 26, 1969    J. B. OLSSON    3,462,786

LOADING RAMP

Filed April 29, 1968    2 Sheets-Sheet 1

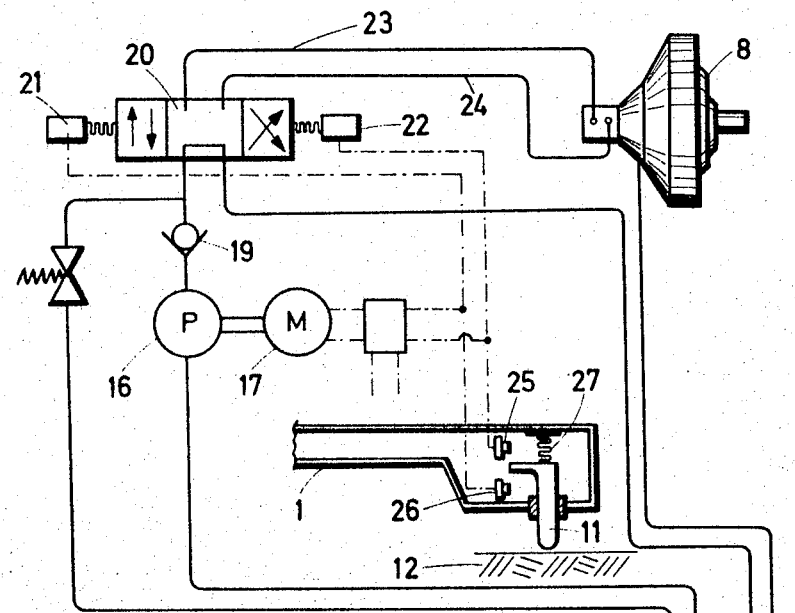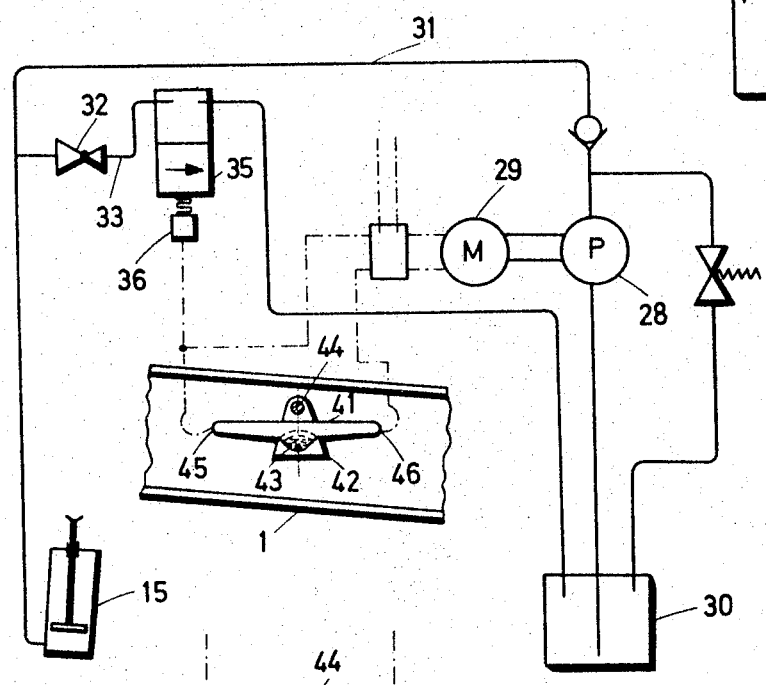

United States Patent Office 3,462,786
Patented Aug. 26, 1969

3,462,786
LOADING RAMP
Johan Bertil Olsson, Goteborg, Sweden, assignor to Associated Cargo Gear AB, Goteborg, Sweden, a corporation of Sweden
Filed Apr. 29, 1968, Ser. No. 724,954
Claims priority, application Sweden, May 10, 1967, 6,528/67
Int. Cl. B65g 11/12
U.S. Cl. 14—71                                         4 Claims

ABSTRACT OF THE DISCLOSURE

A loading ramp for an opening, for instance in the side plating of a ship's hull, is maintained at a certain inclination—towards or away from the opening—irrespective of changes in relative position in the vertical direction between the opening and the fixed support towards which the ramp is leading by means of electrically goverened motor means. Primarily this is obtained by raising and lowering a cross beam to which inner end of the ramp proper is attached. Final adjustment may be brought about by a ram working between the cross beam and the ramp to alter the angle at the hinge connection between said parts.

Background of the invention

The present invention refers to an improved loading ramp, preferably adapted for use in connection to an opening in a ship's side where it is desirable that the ramp shall always maintain a certain inclination in relation to the horizontal plane, in such a manner that loads placed thereon will automatically slide in a certain direction. The ramp is hingedly connected to a beam running across the lower part of the opening and this beam is vertically adjustable by means of electric motor means, the ends of the beam being governed in guides located in connection to the vertical sides of the opening.

Brief description of the drawings

FIGURE 4 shows a switch circuit for an electrically governed hydraulic maneuvering motor adapted to actuate the cross beam.
FIGURE 5 shows a corresponding switch circuit for an electrically governed hydraulic ram adapted to alter the angle between the ramp proper and the cross beam,
and FIGURE 6 shows the rocking lever switch of the diagram according to FIGURE 5 in a different position, corresponding to an other working direction for the ramp.

Figure 1:
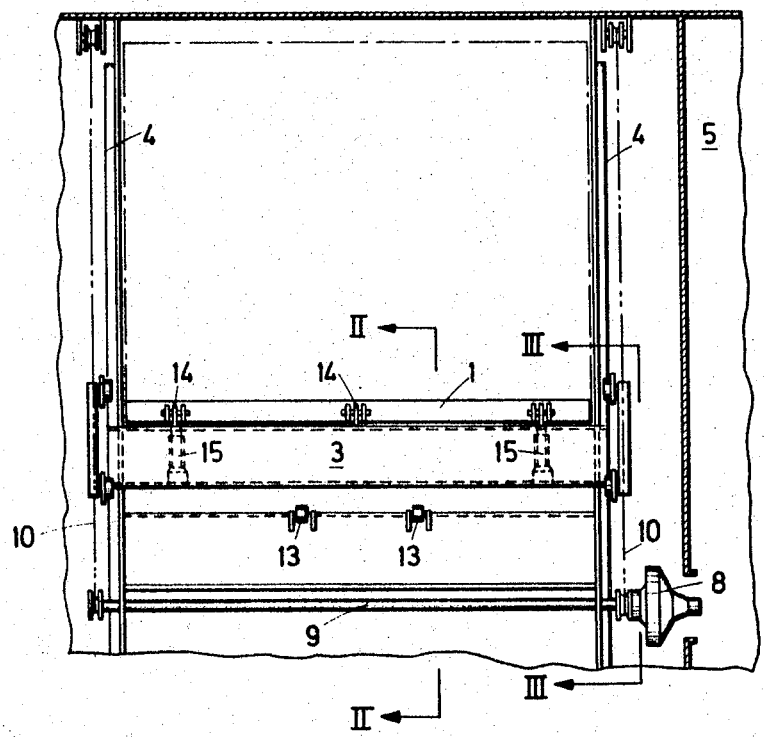
FIGURE 1 shows an elevation of the ramp in swung-out portion, as seen from the inside of the ship.

The ramp is intended to be utilized in connection to an opening in the side plating of a ship. When the ramp is not utilized it may be swung to a vertical position inside the opening whereupon the opening is closed by means of doors or covers of suitable design, not shown here. When the cross beam is returned to the bottom position the lower side of the ramp will slide over a pair of rollers 13 in such a manner that the ramp automatically will be swung-up to vertical position.

The ramp proper 1 is designed as a platform consisting of a number of beams, which carry a plurality of rollers 2 adapted to form a sliding surface when the ramp is in swung-out position. The idea is that the ramp shall be maintained at a certain inclination in relation to the horizontal plane in such a manner, that loads placed thereon will automatically slide away from, or towards the ship.

The ramp is hingedly connected to a cross beam 3, which extends across the opening. The ends of the beam are governed in guides 4 arranged in the vertical side portions of the opening in connection to the side plating 5 of the ship. Each end of the cross beam is designed as a boggie 6 provided with wheels 7 which run in above mentioned guides 4.

The cross beam is adjustable in the vertical direction in the opening by means of a hydraulic motor 8 located to one side of the opening and provide with an elongated shaft 9. This shaft carries two sprocket wheels each operating a chain drive 10 arranged at each vertical side of the opening. The motor is governed by an electric switch circuit, which will be more explicitely described in connection to FIGURE 4. The activation and deactivation, respectively of this circuit is determined by a probe 11 mounted at the free end of the ramp and movable in the vertical direction.

Figure 3:
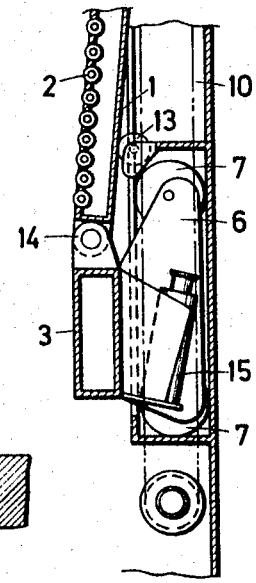
FIGURE 3 shows on a larger scale a detail along line III—III in FIGURE 1, with the ramp in swung-up position.

When the ramp is in working position as shown in FIGURE 3 the probe 11 will maintain contact with the quay 12. The ramp is cantilever designed and is pivotably mounted on the cross beam by means of a number of hinges 14.

A pair of pressure fluid operated rams 15 are adapted to influence the angle between the ramp and the cross beam. The supply of pressure fluid to these rams will be more explicitely described in connection to FIGURES 5 and 6.

The electro-hydraulic system for governing the reversible motor 8 contains a pump 16 and an electric motor 17 driving the same. Fluid is withdrawn from a tank 18 and is pumped through a non-return valve 19 to a regulating valve 20 of known design, which by means of solenoids 21 and 22, respectively may be displaced transversely. Pressure fluid will, depending upon the position of the valve, be transmitted to the motor through either of conduits 23 or 24 respectively, the other of said conduits at the same time serving as return flow conduit.

An electric switch having two spaced contacts 25 and 26, respectively, is mounted at the outer end of the ramp 1. When the ramp is in swung-out position the probe 11, due to its own weight and the action of a spring 27, tends to move downwards. The initial raising and lowering of the cross beam to bring the ramp from swung-up to working position is preferably governed by means of suitable devices, not shown here, and the present circuit will thereafter serve to maintain the desired relative position of the ramp within a certain margin. Normally the upper end of the probe should rest intermediate the two contacts, but if for instance the ramp lifts from the quay 12 the probe will be displaced downwards. It will then cooperate with contact 26 to start the electric motor 17. Simultaneously the solenoid 21 will be activated and the valve 20 be displaced towards the right, whereupon conduit 23 will supply pressure fluid to the hydraulic motor. This means that the cross beam will be lowered somewhat until the probe 11 by abutting against the quay 12 will be moved from the contact 26.

It is not intended that the free end of the ramp shall rest upon the quay, but shall be kept a certain distance above the same in such a manner that it will be possible to bring the forks or the load pallet of a truck below the end of the ramp to directly receive loads sliding down the ramp. If the ramp is depressed towards the quay the probe will instead cooperate with contact 25 in such a manner that solenoid 22 will be activated, valve 20 displaced towards the left and conduit 24 supply pressure fluid to the motor whereby the cross beam will be raised.

The intention is that the ramp shall always maintain a certain inclination in relation to the quay. As the loading or the unloading, respectively, proceeds the position in realtion to the quay will of course be altered and this makes a repeated adjustment of the position of the cross beam necessary. The tide of the water will have the same influence on the relative position between the ship and the quay. Loading and unloading respectively of a certain part of a cargo room may cause a list in the ship, which furthermore necessitates an adjustment of the ramp.

In order to prevent a continuous working up and down of the cross beam one or more pressure fluid operated rams 15 are fitted between the cross beam and the ramp by the aid of which a small adjustment of the inclination may continuously be brought about. The electro hydraulic system utilized in this connection is illustrated in FIGURES 5 and 6. This system also includes a pump 28, which is driven by an electric motor 29, and a fluid receptacle denoted by 30. From the latter fluid by means of a pump is forced past a non return valve in a conduit 31 to the ram 15. In this arrangement it will only be necessary to lift the ramp by means of the pressure fluid. The lowering of the ramp will be brought about by the weight of the ramp and the load placed thereon. A conduit 33 provided with a reduction valve 32 is connected to the conduit leading to the ramp and to the valve 35, from which a further conduit leads back to the receptacle. The valve is governed by a solenoid 36.

Figure 2:
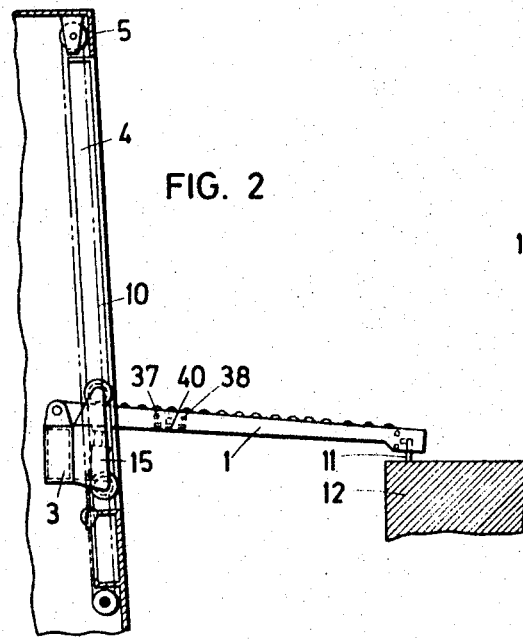
FIGURE 2 shows a section along line II–II in FIGURE 1.

The circuit is operated by a switch mounted in a ramp 1 as shown in FIGURE 2 and containing two contacts 37 and 38, respectively, and a rocking lever 40 loaded by a weight. This lever is by the weight maintained in a horizontal position and the contacts 37 and 38 are so located in the ramp, that a change in the position of the ramp in relation to the horizontal plane will close the circuit by way of either of the contacts. If the ramp should obtain too great an inclination the contact 38 will be switched on, whereupon the electric motor is started and pressure fluid is supplied to the ramp in such a manner that the ramp will be lifted. If on the other hand the ramp should obtain too small an inclination contact 37 will instead switched on, which means that solenoid 36 will be activated and pressure fluid permitted to escape from the ram. This particular switch will thus work within the "dead space" between contacts 25 and 26 in the previously described system.

In FIGURES 5 and 6 a modified design of the rocking lever switch is illustrated. This consists of a sealed tube 41 containing a small quantity of mercury 42. The tube is mounted on a bracket 43 fitted to a shaft 44 extending outside the ramp in such a manner that the position of the tube in relation to the plane of the ramp is adjustable. Contact points 45 and 46, corresponding to contacts 37, 38 in the basic design are arranged at opposite ends of the tube.

As shown in FIGURE 5, the ramp is inclined away from the ship at a certain angle and the tube is placed in horizontal position. If the inclination of the ramp should be altered the drop of mercury will run towards one end of the tube and close the contacts there, thereby starting the operation above described.

In FIGURE 6 the ramp is shown with an inclination towards the ship. The tube 41 will however also in this case be maintained in a horizontal position and will operate in above described manner, should the inclination of the ramp be altered.

By minor adjustments of the angular position of the shaft it is possible to cater for various angles of inclination suited to different kinds of goods and to the speed desired when the individual packages or containers slide down the ramp.

Further modifications and substitution of members may be arranged within the scope of the appended claims. Instead of chains for the displacement of the cross beam rotatable threaded screws operating in nuts located at the ends of the beam be utilized.

What I claim is:

1. A loading ramp for use in connection to an opening in a vertical wall, e.g., the side plating of a ship's hull, and comprising a platform connected at an angle to a beam extending across the lower part of the opening,
   a guide for the ends of the beam at each vertical side of the opening,
   electrically operated motor means to lift and to lower the beam, respectively, in said opening, and
   a probe located at the free end of the platform, directed downwards and adapted to operate electric switch means for governing the electric motor means in such a manner, that the free end of the platform is maintained, with a margin, at a certain distance from a fixed support towards which the platform is leading.

2. A loading ramp as claimed in claim 1, in which the probe consists of a rod, displaceable in its axial direction and adapted to be pushed towards one upper contact point in the switch by abutting against the fixed support, and due to its own weight to sink towards a second, lower contact point when the platform is raised from the fixed support.

3. A loading ramp as claimed in claim 1, in which the platform is hingedly connected to the cross beam, and ram means is arranged to maintain the platform, with a margin, at a certain angle in relation to the cross beam and incidentally also in relation to the horizontal plane, the feature of a rocking lever switch built into the platform and adapted to govern the ram means.

4. A loading ramp as claimed in claim 3, in which the rocking lever switch is mounted in a manner to permit adjustment of the platform at an inclination towards or away from the opening respectively.

References Cited

UNITED STATES PATENTS

| | | | |
|---|---|---|---|
| 1,797,808 | 3/1931 | Tomkinson | 14—71 |
| 2,644,971 | 7/1953 | Rowe | 14—71 |
| 2,846,703 | 8/1958 | Adley | 144—71 |
| 3,027,580 | 4/1962 | Haack | 14—72 |

JACOB L. NACKENOFF, Primary Examiner

U.S. Cl. X.R.

114—.5; 214—14